(12) United States Patent
Lokhandwala et al.

(10) Patent No.: US 6,589,303 B1
(45) Date of Patent: Jul. 8, 2003

(54) HYDROGEN PRODUCTION BY PROCESS INCLUDING MEMBRANE GAS SEPARATION

(75) Inventors: Kaaeid A. Lokhandwala, Union City, CA (US); Richard W. Baker, Palo Alto, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 0 days.

(21) Appl. No.: 09/471,302

(22) Filed: Dec. 23, 1999

(51) Int. Cl.$^7$ ................................................ C01B 3/32
(52) U.S. Cl. ................... 48/197 FM; 48/128; 48/198.2; 48/198.3; 48/DIG. 5; 423/650; 423/652; 423/655
(58) Field of Search ................... 48/197 FM, 127.9, 48/128, 198.2, 198.3, DIG. 5; 423/650, 652, 655, 658.3; 95/45, 50, 96, 139, 140, 141, 143; 585/818, 820

(56) References Cited

U.S. PATENT DOCUMENTS

| | | | |
|---|---|---|---|
| 4,229,188 A | 10/1980 | Intille | 55/16 |
| 4,238,204 A | 12/1980 | Perry | 55/16 |
| 4,362,613 A | 12/1982 | MacLean | 208/108 |
| 4,367,135 A | 1/1983 | Posey, Jr. | 208/108 |
| 4,398,926 A | 8/1983 | Doshi | 55/16 |
| 4,548,619 A | 10/1985 | Steacy | 55/16 |
| 4,654,063 A | 3/1987 | Auvil et al. | 62/18 |
| 4,690,695 A | 9/1987 | Doshi | 55/16 |
| 4,701,187 A | 10/1987 | Choe et al. | 55/16 |
| 4,783,203 A | 11/1988 | Doshi | 55/16 |
| 4,836,833 A | 6/1989 | Nicholas et al. | 55/16 |
| 4,857,078 A | 8/1989 | Watler | 55/16 |
| 4,863,492 A | 9/1989 | Doshi et al. | 55/16 |
| 4,892,564 A | 1/1990 | Cooley | 55/16 |
| 4,963,165 A | 10/1990 | Blume et al. | 55/16 |
| 5,032,148 A | 7/1991 | Baker et al. | 55/16 |
| 5,053,067 A | 10/1991 | Chretien | 62/24 |
| 5,073,356 A | 12/1991 | Guro et al. | 423/415 |
| 5,082,481 A | 1/1992 | Barchas et al. | 62/23 |
| 5,089,033 A | 2/1992 | Wijmans | 55/16 |
| 5,104,425 A | 4/1992 | Rao et al. | 55/16 |
| 5,152,975 A * | 10/1992 | Fong et al. | 423/652 |
| 5,157,200 A | 10/1992 | Mikkinen et al. | 585/803 |
| 5,199,962 A | 4/1993 | Wijmans | 55/16 |
| 5,281,255 A | 1/1994 | Toy et al. | 95/50 |
| 5,332,424 A | 7/1994 | Rao et al. | 95/47 |
| 5,332,492 A | 7/1994 | Maurer et al. | 208/340 |
| 5,354,547 A | 10/1994 | Rao et al. | 423/650 |
| 5,401,300 A | 3/1995 | Lokhandwala et al. | 95/49 |
| 5,407,466 A | 4/1995 | Lokhandwala et al. | 95/49 |
| 5,407,467 A | 4/1995 | Lokhandwala et al. | 95/49 |
| 5,411,721 A | 5/1995 | Doshi et al. | 423/220 |
| 5,435,836 A | 7/1995 | Anand et al. | 95/49 |
| 5,447,559 A | 9/1995 | Rao et al. | 96/4 |
| 5,457,256 A | 10/1995 | Mitariten et al. | 585/655 |
| 5,501,722 A | 3/1996 | Toy et al. | 95/50 |
| 5,507,856 A | 4/1996 | Rao et al. | 95/50 |

OTHER PUBLICATIONS

H. Yamashiro et al., "Plant Uses Membrane Separation," Hydrocarbon Processing, Feb. 1985.

J.M. Abrado et al., "Hydrogen Technologies to Meet Refiners' Future Needs," Hydrocarbon Processing, Feb. 1985.

H. Yamashiro et al., "Hydrogen Purification with Cellulose Acetate Membranes," presented at Europe–Japan Congress on Membranes and Membrane Processes, Jun. 18–21, 1984.

Primary Examiner—Jerry D. Johnson
Assistant Examiner—Basia Ridley
(74) Attorney, Agent, or Firm—J. Farrant

(57) ABSTRACT

An improved process and process train for hydrogen separation and production from gas streams containing hydrogen and light hydrocarbons. The process includes both recovery of hydrogen already in the stream by membrane separation and PSA, and production of additional hydrogen by steam reforming of the hydrocarbons.

17 Claims, 3 Drawing Sheets

U.S. PATENT DOCUMENTS

| | | | |
|---|---|---|---|
| 5,634,354 A | 6/1997 | Howard et al. | 62/624 |
| 5,675,052 A | 10/1997 | Menon et al. | 585/717 |
| 5,689,032 A | 11/1997 | Krause et al. | 585/802 |
| 5,753,010 A | 5/1998 | Sircar et al. | 95/45 |
| 5,753,011 A | 5/1998 | Sircar et al. | 95/45 |
| 6,011,192 A * | 1/2000 | Baker et al. | 585/818 |

OTHER PUBLICATIONS

W.A. Bollinger et al., "Prism™ Separators Optimize Hydrocracker Hydrogen," presented at AlChE 1983 Summer National Meeting, Session No. 66, Aug. 29, 1983.

W.A. Bollinger et al., "Optimizing Hydrocracker Hydrogen," Hydrocarbon Processing, Feb. 1995.

T. Nahieri et al. "Scale–Up of Selective Surface Flow Membrane for Gas Separation," Air Products and Chemicals literature for U.S. D.O.E. Office of Industrial Technology. 1996.

J. Henis, "Chap. 10–Commercial and Practical Aspects of Gas Separation Membranes," in "Polymeric Gas Separation Membranes," pp. 474–477 and 580–584, Paul and Yampolski (eds.), CRC Press, Boca Raton, FL (1994).

"Membrane Technology for Hydrocarbon Separation," Membrane Associates Ltd. Product Literature (Feb. 1997).

R.W. Baker et al., "Low Cost Hydrogen/Novel Membrane Tech. for Hydrogen Separation from Synthesis Gas," Final Report for U.S. DOE Contract #DE–AC21–85M22130, pp. 1–3, 21, and 109–115 (Oct. 1990).

M. Anand, "Novel Selective Surface Flow Membrane for Recovery of Hydrogen," Phase I Final Report for U.S. D.O.E. Contract No. DE–FC04–93AL94461, pp. 14–15, 15b–15c, 16–16a. (Aug. 1995).

M. Anand et al., "Novel Selective Surface Flow Membrane for Recovery of Hydrogen," Phase II Final Report for U.S. D.O.E. Contract No. DE–FC04–93AL94461, pp. 3–5, 11–12, 17, 26, and 30. (Apr. 1996).

M. Rao et al, "Nanoporous carbon membranes for separation of gas mixtures by selective surface flow," J. of Membrane Science, vol. 85, pp. 262–263 (1993).

M. Rao et al, "Nanoporous carbon membranes for gas separation," Gas Separation and Purification, vol. 7, No. 4, pp. 282–284 (1993).

* cited by examiner

HYDROGEN PRODUCTION BY PROCESS INCLUDING MEMBRANE GAS SEPARATION

FIELD OF THE INVENTION

The invention relates to production of high-purity hydrogen by a combination of membrane gas separation, steam reforming and pressure swing adsorption.

BACKGROUND OF THE INVENTION

A number of off-gas streams containing hydrogen and hydrocarbons are generated during refinery and petrochemical plant operations. These streams include overheads from phase separators; fractionation columns; stabilization columns; demethanizers; debutanizers; absorption, stripping and scrubbing units; and so on. In some cases, the composition of the stream renders it suitable for reintroduction into the train of operations upstream or downstream of its generation point. Frequently, however, the stream composition is such that it is not cost-effective to treat it further and it is passed to the plant fuel header.

Streams passed to the fuel header represent lost products, both hydrogen and hydrocarbons; in addition, only a finite quantity of fuel gas is needed, so plants can become bottlenecked by over supply of fuel gas. Meanwhile, most refineries operate with a hydrogen deficit, and the demands of the refining and chemical industries for high-purity hydrogen continue to grow year by year. Improved processes for hydrogen manufacture and/or recovery from such light hydrocarbon/hydrogen off-gases would clearly be useful to industry.

For hydrogen separation from light hydrocarbons, techniques that have been employed in refineries and petrochemical plants include pressure swing adsorption (PSA) and membrane separation. Representative references that teach the use of PSA to treat off-gases from petrochemical processes include U.S. Pat. Nos. 5,332,492 and 5,457,256, to UOP, and U.S. Pat. No. 5,675,052, to BOC. Representative references describing membrane separation processes include U.S. Pat. Nos. 4,362,613 and 4,367,135, to Monsanto, U.S. Pat. No. 4,548,619, to UOP, U.S. Pat. No. 5,053,067, to L'Air Liquide, U.S. Pat. No. 5,082,481, to Lummus Crest, U.S. Pat. No. 5,157,200, to Institut Francais du Petrole, and U.S. Pat. No. 5,689,032, to Krause/Pasadyn. Other references that describe membrane-based separation of hydrogen from gas streams in a general way include U.S. Pat. No. 4,654,063, to Air Products, and U.S. Pat. No. 4,892,564, to Cooley.

The use of polymeric membranes to treat off-gas streams in refineries is also described in the following papers: "Hydrogen Purification with Cellulose Acetate Membranes", by H. Yamashiro et al., presented at the Europe-Japan Congress on Membranes and Membrane Processes, June 1984; "Prisms™ Separators Optimize Hydrocracker Hydrogen", by W. A. Bollinger et al., presented at the AIChE 1983 Summer National Meeting, August 1983; "Plant Uses Membrane Separation", by H. Yamashiro et al., in Hydrocarbon Processing, February 1985; and "Optimizing Hydrocracker Hydrogen", by W. A. Bollinger et al., in Chemical Engineering Progress, May 1984. These papers describe system designs using cellulose acetate or similar membranes that permeate hydrogen and reject hydrocarbons. The use of membranes in refinery separations is also mentioned in "Hydrogen Technologies to Meet Refiners' Future Needs", by J. M. Abrardo et al. in Hydrocarbon Processing, February 1995. A chapter in "Polymeric Gas Separation Membranes", D. R. Paul et al. (Eds.) entitled "Commercial and Practical Aspects of Gas Separation Membranes", by Jay Henis describes various membrane-based hydrogen separations.

Besides individual treatment by PSA or membranes, numerous processes are known in which membrane separation and PSA are combined in a complementary way to carry out an integrated process. These include the following U.S. Pat. Nos. 4,229,188; 4,238,204; 4,398,926; 4,690,695; 4,701,187; 4,783,203; 4,836,833; 4,863,492, and 5,411,721.

In all of the above-cited references, the membranes used to perform the hydrogen/hydrocarbon separation are hydrogen-selective, that is, they permeate hydrogen preferentially over hydrocarbons and all other gases in the mix. A difficulty that hampers the use of both PSA systems and membrane separation systems of this type is the presence in off-gases of the $C_5$ and heavier hydrocarbons, water vapor and hydrogen sulfide. In the case of membrane systems, the presence of these materials can cause catastrophic collapse of the membranes, as discussed in detail in co-owned U.S. Pat. No. 6,011,192, entitled "Membrane-Based Conditioning for Adsorption System Feed Gas", which is incorporated herein by reference in its entirety. In the case of PSA systems, the $C_{5+}$ hydrocarbons and other contaminants may sorb preferentially onto the bed, both reducing the capacity of the beds to sorb the light hydrocarbons that they are intended to remove, and giving rise to serious regeneration difficulties.

Instead of using hydrogen-selective membranes, it is possible to carry out membrane separations in which hydrocarbons permeate selectively and hydrogen is rejected in the residue stream. Processes that rely on selective permeation of hydrocarbons to separate at least some hydrocarbons from at least some other less condensable gases are taught, for example, in U.S. Pat. Nos. 4,857,078; 4,963,165; 5,032,148; 5,089,033; 5,199,962, 5,281,255; 5,401,300; 5,407,466; 5,407,467; and 5,501,722, all to Membrane Technology and Research (MTR). Literature from Membrane Associates Ltd., of Reading, England, shows and describes a design for pooling and downstream treating various refinery off-gases, including passing of the membrane permeate stream to subsequent treatment for LPG recovery. A report by Membrane Technology and Research, Inc. to the U.S. Department of Energy entitled "Low Cost Hydrogen/Novel Membrane Technology for Hydrogen Separation from Synthesis Gas" (October 1990) lists permeation data for polyamide copolymer membranes and shows diagrams indicating potential positions for membrane separation units in a coal gasifier train.

U.S. Pat. No. 4,857,078, to Watler/MTR, mentions that, in natural gas liquids recovery, streams that are enriched in hydrogen can be produced as retentate by a rubbery membrane.

An alternative approach, also using membranes that reject hydrogen and preferentially permeate hydrocarbons, is to use not a polymeric membrane but a carbon membrane, such as those taught in U.S. Pat. No. 5,104,425, to Air Products and Chemicals. These membranes are made up of a microporous adsorbent material on a porous substrate, and can separate gas mixtures based on selective adsorption onto the pore walls, rather than by the solution/diffusion mechanism of conventional polymeric membranes. Thus, the mechanism of separation is akin to the separation mechanism in PSA. This allows separation between various hydrocarbon fractions to be made, and hydrogen tends to be retained in the membrane residue stream.

It is known to combine these membranes with PSA to carry out integrated separations of light hydrocarbons from hydrogen. U.S. Pat. No. 5,332,424 describes fractionation of a gas stream containing $C_1$–$C_4$ hydrocarbons and hydrogen using a bank of membrane modules followed by a PSA unit. Other Air Products patents that show processes involving separation by carbon adsorbent membranes followed by PSA include U.S. Pat. No. 5,507,856 and 5,753,011. U.S. Pat. No. 5,435,836 teaches PSA followed by adsorbent carbon membranes for a similar separation. U.S. Pat. No. 5,634,354 teaches combinations of adsorbent membranes and PSA to treat gases containing hydrogen and olefins.

Adsorbent membrane systems similar to those disclosed in the above patents are described in papers by M. B. Rao and S. Sirkar in Journal of Membrane Science (Vol. 85, 253–264 (1993)) and Gas Separation and Purification (Vol.7, No.4, 279–284 (1993)). Adsorbent membrane/PSA hybrid systems are described in some detail in reports by M. Anand and K. A. Ludwig to the U.S. Department of Energy ("Novel Selective Surface Flow Membranes for the Recovery of Hydrogen from Waste Gas Streams", Phase I (1995) and Phase II (1996) Final Reports under contract number DE-FC04-93AL94461), and in materials distributed at a U.S. Department of Energy, Office of Industrial Technology, exhibit in Washington, D.C. ("Scale-Up of Selective Surface Flow Membrane for Gas Separation", T. Nahieri et al., Air Products and Chemicals, 1996).

In all of the above references, the gas mixtures introduced into the adsorbent carbon membrane system are limited to those containing no heavier than $C_4$ hydrocarbons. In fact, the references are explicit that a pretreatment system (temperature swing adsorption) is used to remove $C_{5+}$ hydrocarbons, water vapor and hydrogen sulfide that might foul the membranes. Since the membranes rely on adsorption for their separation properties, they are vulnerable to the same problems as PSA systems, namely that the more readily is a component sorbed, the more difficult is it to desorb. These contaminants, once introduced into the membranes, block the sorption sites and prevent the membranes functioning for their intended purpose.

Turning from hydrogen separation to hydrogen manufacture, steam reforming of light hydrocarbons is widely used. Typical steam reforming reactions are as follows:

$$CH_4+H_2O\rightarrow CO+3H_2$$

$$CH_4+2H_2O\rightarrow CO_2+4H_2$$

$$C_2H_6+4H_2O\rightarrow 2CO_2+7H2$$

$$C_3H_8+6H_2O\rightarrow 3CO_2+10H_2$$

$$C_4H_{10}+8H_2O\rightarrow 4CO_2+13H_2$$

$$C_5H_{12}+10H_2O\rightarrow 5CO_2+16H_2$$

$$C_6H_{14}+12H_2O\rightarrow 6CO_2+19H_2$$

The raw gas that results from these reforming reactions is a mixture of at least hydrogen, carbon dioxide, carbon monoxide, methane, water, and sometimes other components, such as nitrogen and argon. In many cases, a shift reactor is used after the primary reformer to convert carbon monoxide to carbon dioxide by the water gas shift reaction:

$$CO+H_2O\rightarrow CO_2+H_2$$

The gas mixture that results from these reactions is known as synthesis gas. To produce high-grade hydrogen from the synthesis gas, the hydrogen must be separated from the other gases in the mix. Pressure swing adsorption (PSA) is widely used for this step, and can produce a hydrogen product with a purity of at least 99.9%. The tail gas stream produced when the PSA beds are regenerated is usually burnt to provide heat for the steam reformer.

The source of hydrocarbons for steam reforming is most commonly natural gas. In principle, however, many other streams containing light hydrocarbons, including various light overhead streams from refining and petrochemical operations, may also be used as hydrocarbon feedstocks for steam reformers. Many of these streams, such as the light ends from hydrocrackers, hydrotreaters, catalytic reformers and catalytic crackers, already contain non-negligible amounts of hydrogen, or may even contain hydrogen as the major component. This hydrogen does not take part in the steam hydrocarbon reforming reactions, yet occupies reformer space capacity. It is, therefore, inefficient to produce hydrogen from such streams and, despite their potential value as a hydrogen manufacturing feedstock, they are often burnt as fuel.

A number of patents concern treatment of mixtures of hydrogen, carbon dioxide, carbon monoxide and methane from steam reformers. U.S. Pat. No. 4,836,833 describes a process for recovering discrete product streams of hydrogen and carbon monoxide from synthesis gas by a combination of carbon-dioxide-selective PSA with a combined PSA/membrane step for carbon monoxide/hydrogen separation. U.S. Pat. No. 5,073,356 also concerns the production of carbon monoxide and hydrogen by steam reforming, using a gas separation scheme including PSA, vacuum swing adsorption (VSA) and membranes. In U.S. Pat. No. 5,435,836, the gas mixture from the steam reformer is treated by PSA to recover a high purity hydrogen stream. The waste gas from the PSA unit is then treated by membrane separation using a carbon adsorbent membrane. The hydrogen-rich residue is returned to the PSA unit and the permeate gas from the membrane unit can optionally be used as fuel for the steam reformer. U.S. Pat. No. 5,753,010 discloses a process similar to that of U.S. Pat. No. 5,435,836, but in which the tail gas from the PSA unit is split into two fractions of unlike composition, which are treated separately in two discrete membrane steps.

U.S. Pat. No. 5,354,547 discloses in FIGS. 2 and 3 process designs for integrating steam reforming, adsorbent carbon membranes and PSA to produce a high-purity hydrogen product. In FIG. 3 a side-stream from the reformer feed is run across the permeate side of the membrane as a sweep gas before being introduced as feedstock into the reformer. This process configuration is also shown in U.S. Pat. No. 5,447,559.

Patent application Ser. No. 09/083,560, now co-owned U.S. Pat. No. 6,011,192, describes a process in which a rubbery polymeric membrane is used to condition a gas stream to remove heavy hydrocarbons before PSA treatment.

Patent application Ser. No. 09/273,207, now co-owned U.S. Pat. No. 6,350,371, describes the use of hydrogen-rejecting membranes to treat tail gas from a PSA unit used to recover hydrogen from gas generated during catalytic reforming.

SUMMARY OF THE INVENTION

The invention is an improved process and process train for hydrogen separation and production. The invention uses incoming gas streams containing hydrogen and light hydrocarbons, specifically at least one $C_1$–$C_4$ hydrocarbon and at least one $C_5$–$C_8$ hydrocarbon, such as off-gas streams from oil-refining operations and the like. An important aspect of the process is that it includes both recovery of hydrogen already in the stream by membrane separation and PSA, and production of additional hydrogen by steam reforming of the hydrocarbons. By steam reforming, we mean the production of a synthesis gas containing at least hydrogen and carbon oxides from a feed mix including a light hydrocarbon, typically methane, and steam.

The process involves using a membrane separation step to separate hydrocarbons and hydrogen in the incoming gas stream. The membrane used is a polymeric membrane selective for hydrocarbons over hydrogen, which creates a hydrogen-depleted, hydrocarbon-enriched permeate stream and a hydrocarbon-depleted, hydrogen-enriched residue stream. The membrane separation step serves several purposes. In general, the heavier the hydrocarbon, the faster will be the membrane permeation rate. Thus, any $C_5$–$C_8$ hydrocarbons present in the incoming gas will be removed into the permeate stream faster and more completely than the $C_1$–$C_4$ hydrocarbons. The result is that the residue stream from the membrane separation step contains much less $C_{5+}$ hydrocarbon than was present in the incoming stream. This can be expressed as a reduction in the hydrocarbon dewpoint of the residue stream. Most preferably, the dewpoint of the residue stream is at least about 10° C. lower, as measured at 200 psia, than the dewpoint at 200 psia of the incoming stream. This hydrogen-rich stream bypasses the steam reforming step and is passed to PSA treatment. Here the hydrogen is separated from other gases in the mix to produce a high-purity hydrogen product stream. By using the membrane separation step upstream of the PSA unit, the membrane separation step serves as a conditioning step to protect the PSA unit from exposure to contaminants that are difficult to desorb once they reach the beds.

The hydrocarbon-enriched, hydrogen-depleted permeate stream from the membrane separation step provides hydrocarbon feedstock to the steam reformer. By reducing the amount of hydrogen and increasing the amount of hydrocarbon passing through the steam reformer, the unit processing capacity of the reformer can be utilized more efficiently. Thus, streams that would previously have been too rich in hydrogen and too lean in light hydrocarbons to be attractive as steam reformer feedstocks may now be used for hydrogen manufacture. The syngas product stream is withdrawn from the reformer and passed to the PSA unit, where non-hydrogen components are adsorbed, leaving a high-purity hydrogen stream as product.

Thus, in its most simple form, the invention includes three unit operations or steps: the membrane separation step, the steam reforming step and the pressure swing adsorption (PSA) step. The membrane separation step divides the gas stream to be used in the process into a hydrogen-rich portion and a hydrocarbon-rich portion, and may be carried out in one or multiple stages or steps. The hydrocarbon/steam reforming reactions may be performed in any manner and using any types of reactors, catalysts and operating schemes known in the art. The reactor arrangement may, but need not necessarily, include a shift reactor downstream of the hydrocarbon reforming reactor, the purpose of which is to convert carbon monoxide formed in the reforming reactor to carbon dioxide. The hydrocarbon feedstock to the steam reformer comprises the membrane permeate stream. Frequently, but not necessarily, the permeate stream supplements, or is supplemented by, other hydrocarbon feedstock material, such as a natural gas stream. The PSA step may be carried out by any convenient manner known in the art and typically involves the use of a series of beds connected in such a way that each bed can be switched periodically from adsorption mode to regeneration mode. The tail gas produced when the PSA beds are regenerated may be burnt as fuel to heat the steam reformer. In the process of the invention, two streams—the membrane residue stream and the synthesis gas stream—need to be treated by PSA. This can be done by feeding the streams to discrete PSA units, or by feeding them independently or together to the same unit.

In a basic embodiment, these treatment steps take the following form:

(a) providing a gas stream containing at least a $C_1$–$C_4$ hydrocarbon, a $C_5$–$C_8$ hydrocarbon and hydrogen;

(b) passing the gas stream across the feed side of a polymeric membrane having a feed side and a permeate side, the membrane being selective in favor of the $C_1$–$C_4$ hydrocarbon and the $C_5$–$C_8$ hydrocarbon over hydrogen, under conditions such that a driving force for transmembrane permeation is provided by a pressure difference between the feed and permeate sides;

(c) withdrawing from the permeate side a hydrocarbon stream enriched in the $C_1$–$C_4$ hydrocarbon and the $C_5$–$C_8$ hydrocarbon and depleted in hydrogen compared with the gas stream;

(d) withdrawing from the feed side a residue stream enriched in hydrogen compared with the gas stream;

(e) feeding the hydrocarbon stream to a steam reformer and there reacting the $C_1$–$C_4$ hydrocarbon and the $C_5$–$C_8$ hydrocarbon with steam to form a synthesis gas stream;

(f) passing the synthesis gas stream and the residue stream together or separately through a pressure swing adsorption system capable of selectively adsorbing hydrocarbons and rejecting hydrogen;

(g) withdrawing a purified hydrogen product stream from the pressure swing adsorption system.

In another aspect, the invention is an apparatus comprising a specific combination of a membrane separation unit capable of producing a hydrogen-enriched residue stream and a hydrocarbon-enriched permeate stream, a steam reformer, and a PSA unit capable of selectively removing hydrocarbons from hydrogen.

The invention has a number of advantages. In particular, the process yields more high-purity hydrogen from the same amount of raw hydrocarbon feedstock or from the same steam reformer reactor capacity than is possible using prior art processes.

The invention differs from the numerous prior art combinations of membrane separation with PSA of which applicants are aware in several regards. First, the membrane separation and PSA steps are integrated with the steam reforming step in such a way that raw gas entering the process is treated first by the membrane separation step. Furthermore, both the membrane residue and permeate streams pass through the PSA step, (although the permeate stream has by then been significantly changed in composition in the reforming step).

Yet another difference and advantage is that the membrane separation step tolerates exposure to heavier hydrocarbons and indeed protects the adsorption system by removing these components from the feed gas. As was discussed above, if $C_5$–$C_8$ hydrocarbons, or even heavier hydrocarbons, reach the adsorbent system, they sorb very readily onto the beds. Bed regeneration is typically carried out by lowering the pressure on the bed, thereby desorbing the previously sorbed materials and flushing them out of the bed. Since $C_5$–$C_8$ hydrocarbon components are liquid at room temperature and pressure, they are difficult to desorb, and tend to remain in the bed, causing progressive fouling. To remove such contaminants, it may even be necessary to draw a vacuum on the bed, which increases the cost and complexity of operation substantially. These problems are ameliorated or avoided completely by the upstream membrane step.

Since the membrane can withstand heavier hydrocarbons, pretreatment steps before the membrane separation step to remove them, although optional, are not necessary. This contrasts with cellulose acetate and like membranes, which can suffer catastrophic failure if hydrocarbons condense within the membrane modules. Also, unlike other types of hydrogen-rejecting membranes, such as adsorbent carbon membranes, the presence of a heavier hydrocarbon component does not have a significant negative impact on the permeation of a lighter component. For example, the presence of small amounts of $C_8$ and above hydrocarbons will not impede the ability of the membrane to remove $C_6$ components. Thus, the membranes can handle a diversity of stream types that would be impossible to treat in prior art processes.

Another benefit is that polymeric materials are used for the membranes. This renders the membranes easy and inexpensive to prepare, and to house in modules, by conventional industrial techniques, unlike other types of hydrogen-rejecting membranes, such as finely microporous inorganic membranes, including adsorbent carbon membranes, pyrolysed carbon membranes and ceramic membranes, which are very difficult and costly to fabricate in industrially useful quantities.

Unlike many other polymeric membrane separation processes that have been used to separate hydrogen from hydrocarbons in the past, the present process uses membranes that are hydrogen-rejecting. That is, the hydrocarbons permeate the membrane faster than hydrogen, leaving a residue stream on the feed side that is concentrated in the slower-permeating hydrogen. This means that the stream may be passed to the PSA step without recompression. This provides an advantage compared with the use of hydrogen-selective membranes, which produce permeate hydrogen streams at low pressure. Such stream require significant compression before being sent to PSA.

A pressure difference between the feed and permeate sides provides the driving force for transmembrane permeation in the membrane separation step. If the gas to be treated is already at elevated pressure, it may be passed directly to the membrane separation step. Otherwise the gas is compressed before passing to the membrane unit. Optionally, for example if the stream is comparatively rich in $C_{5+}$ hydrocarbons, both a compression step and a cooling step can be carried out upstream of the membrane unit, to enable the $C_5$–$C_8$ hydrocarbons to be recovered from the process in liquid form as a separate product.

Specific exemplary streams to which the process of the invention can be applied include, but are not limited to, off-gas streams from hydrocrackers; hydrotreaters of various kinds, including hydrodesulfurization units; coking reactors; catalytic reformers; catalytic crackers; specific isomerization, alkylation and dealkylation units; and hydrogenation and dehydrogenation processes. The invention can be applied to any streams containing hydrogen, a $C_1$–$C_4$ hydrocarbon, and a $C_5$–C8 hydrocarbon. The presence of the $C_5$–$C_8$ hydrocarbon component means that most streams for which the invention is useful are characterized by a hydrocarbon dewpoint at 400 psia of at least about 10° C., and many are characterized by a hydrocarbon dewpoint at 200 psia of at least about 10° C. This does not mean that the gas is at 400 psia or 200 psia before, during or after treatment (although it could be), but merely serves to express the hydrocarbon content of the gas in a definite way. Many gas streams to be treated by the invention have higher dewpoints, such as 20° C., 30° C., 40° C. or 50° C., all as measured at 200 psia.

The invention is especially useful for treating streams that are neither very rich in heavier hydrocarbons nor very rich in hydrogen. By this, we mean streams that contain no more than about 80% hydrogen and no more than about 10% $C_5$–$C_8$ hydrocarbon. Absent the process of the invention, such streams are typically used as fuel gas. The invention provides separation and recovery of the valuable hydrogen already in the stream, and efficient use of the hydrocarbons in the stream to make more hydrogen.

Furthermore, the invention reduces the fuel gas load in the plant, by utilizing streams that would previously have been sent to the fuel gas header. In plants where fuel gas generation is at capacity, the invention provides debottlenecking capability, allowing throughput of the unit operations generating the off-gas to be increased.

It is to be understood that the above summary and the following detailed description are intended to explain and illustrate the invention without restricting its scope.

DETAILED DESCRIPTION OF THE INVENTION

Figure 1:
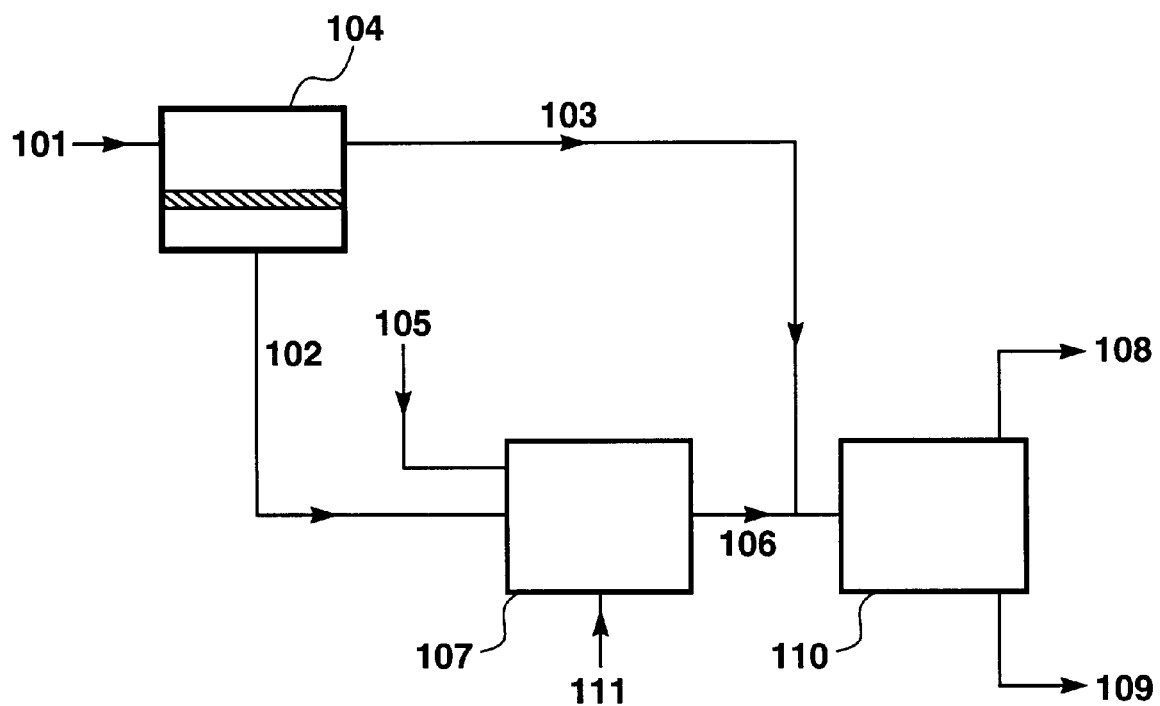
FIG. 1 is a schematic drawing showing a basic embodiment of the invention.

The terms gas and vapor are used interchangeably herein.

The term dewpoint, unless otherwise explicitly stated, means hydrocarbon dewpoint.

The term light hydrocarbon means a hydrocarbon having no more than six carbon atoms.

The term $C_1$–$C_4$ hydrocarbon means a hydrocarbon having at least one carbon atom and no more than four carbon atoms.

The term $C_5$–$C_8$ hydrocarbon means a hydrocarbon having at least five carbon atoms and no more than eight carbon atoms.

Percentages herein are by volume unless otherwise stated.

The invention is an improved process and process train for hydrogen separation and production. The source of the hydrogen is a stream containing at least hydrogen, a $C_1$–$C_4$ hydrocarbon, typically, but not necessarily, methane, and a $C_5$–$C_8$ hydrocarbon. Such gas mixtures are frequently encountered as off-gas streams from unit operations in oil refining, from petrochemical production, and similar activities. The gas mixture may contain these components in any proportions. As non-limiting examples, the gas may be predominantly hydrogen, such as 70% hydrogen or more, with amounts of $C_1$ and $C_2$ hydrocarbons, such as 20–30%, and smaller amounts of $C_5$–$C_8$ hydrocarbons, such as 1–10%; or may be predominantly a hydrocarbon mix, such as 80% or more of $C_5$–$C_8$ hydrocarbons, with 20% or less hydrogen. However, as stated above, the presence of the $C_5$–$C_8$ hydrocarbon component means that most hydrogen source streams for which the invention is useful are characterized by a hydrocarbon dewpoint at 400 psia of at least about 10° C., and many are characterized by a hydrocarbon dewpoint at 200 psia of at least about 10° C. or higher, such as 20° C., 30° C., 40° C. or 50° C.

The primary goal of the process is to produce high-purity hydrogen by making use of a stream that might otherwise be usable only as fuel. Another goal in some circumstances is to debottleneck the operation that produces the gas mixture used in the process. Those of skill in the art will appreciate such considerations and will be able to apply the teachings herein as appropriate to specific gas mixtures and industrial circumstances.

The invention is of use in any steam reforming situation where a gas stream containing hydrogen and light hydrocarbons is available as a potential feedstock to the steam reformer. Steam reforming is well known in the chemical processing arts, and involves the formation of various gas mixtures commonly known as synthesis gas or syngas from a light hydrocarbon feedstock, steam and optionally other gases, such as air, oxygen or nitrogen. Synthesis gas usually contains at least hydrogen, carbon dioxide, carbon monoxide and methane, but the exact composition can be varied depending on its intended use. For example, if the gas is to be used to manufacture ammonia, air may be added to the reforming reactor intake so that the synthesis gas contains hydrogen and nitrogen in the appropriate 3:1 proportions for subsequent conversion to ammonia. On the other hand, if the gas is to be used to make methanol, nitrogen is not needed, but careful control of the hydrogen:carbon monoxide ratio in the synthesis gas is important. In yet other cases, a high purity hydrogen product gas may be the primary goal and the raw synthesis gas is then purified to remove all other components.

Plant design and process operating conditions thus differ in their details, but the steam reforming process always includes a basic steam/hydrocarbon reforming reaction step, carried out at high temperature and elevated pressure, and one or more subsequent treatments of the raw synthesis gas to remove carbon dioxide or make other adjustments to the gas composition.

The present invention is concerned principally with steam reforming processes in which a stream of purified hydrogen represents at least one of the goals and products. The invention in a basic aspect is shown schematically in FIG. 1. It will be appreciated by those of skill in the art that this, and the other figures described below, are very simple schematic diagrams, intended to make clear the key aspects of the invention, and that an actual process train will usually include many additional components of a standard type, such as heaters, chillers, condensers, pumps, blowers, other types of separation and/or fractionation equipment, valves, switches, controllers, pressure-, temperature-, level- and flow-measuring devices and the like.

Referring now to FIG. 1, stream 101, the gas mixture containing hydrogen, methane and/or other $C_1$–$C_4$ hydrocarbon, and a $C_5$–$C_8$ hydrocarbon, enters the membrane separation step or unit, 104. The membrane unit contains a membrane that is selective for hydrocarbons over hydrogen.

The permeability of a gas or vapor through a membrane is a product of the diffusion coefficient, D, and the Henry's law sorption coefficient, k. D is a measure of the permeant's mobility in the polymer; k is a measure of the permeant's sorption into the polymer. The diffusion coefficient tends to decrease as the molecular size of the permeant increases, because large molecules interact with more segments of the polymer chains and are thus less mobile. The sorption coefficient depends, amongst other factors, on the condensability of the gas.

Depending on the nature of the polymer, either the diffusion or the sorption component of the permeability may dominate. In rigid, glassy polymer materials, the diffusion coefficient tends to be the controlling factor and the ability of molecules to permeate is very size dependent. As a result, glassy membranes tend to permeate small, low-boiling molecules, such as hydrogen and methane, faster than larger, more condensable molecules, such as $C_{2+}$ organic molecules. For rubbery or elastomeric polymers, the difference in size is much less critical, because the polymer chains can be flexed, and sorption effects generally dominate the permeability. Elastomeric materials, therefore, tend to permeate large, condensable molecules faster than small, low-boiling molecules. Thus, most rubbery materials are selective in favor of $C_{2+}$ hydrocarbons over hydrogen, and can be used in the invention to produce a permeate stream enriched in these components. Examples of polymers that can be used to make such elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethyleneibutylene block copolymers, and thermoplastic polyolefin elastomers.

However, for the smallest, least condensable hydrocarbons, methane in particular, even rubbery polymers tend to be selective in favor of hydrogen, because of the relative ease with which the hydrogen molecule can diffuse through most materials. For example, neoprene rubber has a selectivity for hydrogen over methane of about 4, natural rubber a selectivity for hydrogen over methane of about 1.6, and Kraton, a commercial polystyrene-butadiene copolymer, has a selectivity for hydrogen over methane of about 2.

If the $C_1$–$C_4$ hydrocarbon component present in the stream is entirely methane, or mostly methane, however, it is desirable that the membrane be selective for all hydrocarbons, including methane, over hydrogen. To applicants' knowledge, among the polymeric membranes that perform gas separation based on the solution/diffusion mechanism, silicone rubber is the only material that is selective in favor of methane over hydrogen, although any polymeric membrane that is found to have a methane/hydrogen selectivity greater than 1 can also be used as a preferred membrane material. For example, other materials that might perhaps be found by appropriate experimentation to be methane/hydrogen selective include other polysiloxanes.

Another class of polymer materials that has at least a few members that should be methane/hydrogen selective, at least in multicomponent mixtures including other more condensable hydrocarbons, is the superglassy polymers, such as poly(1-trimethylsilyl-1-propyne) [PTMSP] and poly(4-methyl-2-pentyne) [PMP]. These differ from other polymeric membranes in that they do not separate component gases by solution/diffusion through the polymer. Rather, gas transport is believed to occur based on preferential sorption and diffusion on the surfaces of interconnected, comparatively long-lasting free-volume elements. Membranes and modules made from these polymers are less well developed to date; this class of materials is, therefore, less preferred than silicone rubber.

The membranes may be manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules are our most preferred choice. Since polymeric materials are used for the membranes, they are relatively easy and inexpensive to prepare and to house in modules, compared with other types of membranes that might be used as hydrogen-rejecting membranes, such as finely microporous inorganic membranes, including adsorbent carbon membranes, pyrolysed carbon membranes and ceramic membranes.

To achieve a high transmembrane hydrocarbon flux, the selective layer responsible for the separation properties should be thin, preferably, but not necessarily, no more than 30 $\mu$m thick, more preferably no more than 20 $\mu$m thick, and most preferably no more than 5 $\mu$m thick.

A driving force for transmembrane permeation is provided by a pressure difference between the feed and permeate sides of the membrane. Preferred gas streams for use in the process are already at high pressure before entering the process. For example, if stream 101 is an off-gas stream from a high-pressure refinery or petrochemical operation, it may be at a pressure in excess of 500 psia, such as 600 psia, 700 psia or even higher. In this preferred case, it is possible to operate the membrane separation step 104 without any additional compression of stream 101. Alternatively, stream 101 may be compressed to any desired pressure before it is passed to the membrane unit. The pressure on the permeate side may be maintained at any convenient value. Most preferably, the pressure on the permeate side should be about the same as the pressure of the steam reforming step, so that the permeate stream 102 can be introduced as feedstock into the reformer without further pressure adjustment. Thus, the most preferred permeate pressure is about 400 psia and the most preferred feed gas pressure is at least about 600 psia, to provide a pressure drop of at least 200 psia between the feed and permeate sides. Alternatively, a lower permeate pressure of any value may be maintained, and the permeate stream 102 may be recompressed before passing to the steam reformer.

Depending on the composition of the membrane feed stream 101, a single-stage membrane separation operation may be adequate to produce a permeate stream acceptably lean in hydrogen and rich in hydrocarbons. If the permeate stream requires further treatment, it may be passed to a second bank of modules for a second-stage treatment, and so on. Likewise, if the residue stream requires further separation, it may be passed to a second bank of modules for a second-step treatment, and so on. Such multistage or multistep processes, and variants thereof, are familiar to those of skill in the art.

Those of skill in the art will appreciate that the membrane area and membrane separation step operating conditions can be varied depending on the specific separation goals. By selectively removing the $C_1$–$C_4$ and the $C_5$–$C_8$ hydrocarbons and selectively retaining hydrogen, the membrane separation step results in a membrane residue stream, 103, that is enriched in hydrogen and depleted in hydrocarbons compared with stream 101. The lower the hydrocarbon concentration, and particularly the $C_5$–$C_8$ hydrocarbon concentration, in the residue stream, the more efficient and simple will be the following PSA step, because components that are difficult to desorb have been reduced or removed. Expressing the preferences for the residue stream characteristics in terms of removal of $C_5$–$C_8$ hydrocarbons, it is most preferred to remove at least 95% of all $C_5$–$C_8$ hydrocarbons, insofar as this will provide the most conditioning, and hence the most protection for the following selective adsorption step. Expressing the most preferred residue stream composition in terms of hydrogen concentration, it is preferable that the residue stream have a hydrogen concentration at least about 80%. Of course, the membrane separation unit can be configured and operated to provide a residue stream from which essentially all of the hydrocarbon has been removed. This can be accomplished by increasing the stage-cut of the membrane separation step, that is, the ratio of permeate flow to feed flow, to the point that little of anything except hydrogen is left in the residue stream. As the stage-cut is raised, however, the permeate stream becomes progressively more diluted by the slower permeating hydrogen. Thus, depending on the composition of the feed stream, in particular the proportions of the individual hydrocarbons and the proportions of hydrogen, meeting these most preferred goals may result in excessive hydrogen transport into the permeate. The higher the hydrogen concentration in the permeate stream, the less efficient is the steam reforming step, since more of the steam reformer feedstock consists of a component that is inert in the reforming reactions.

The tradeoff between acceptable residue and permeate compositions and acceptable costs can be established by those of skill in the art having regard to the teachings herein. In general, we prefer to run the membrane separation step so as to produce a residue stream reduced in $C_5$–$C_8$ hydrocarbon content by at least about 80%, more preferably at least about 90%, compared with the raw feed stream, and from which $C_1$–$C_4$ hydrocarbons have been removed sufficiently to raise the hydrogen concentration to at least about 65%, and more preferably to a level about equal to the hydrogen concentration in the stream going from the reformer to the PSA step, which will generally be at least about 70% hydrogen.

Preferably, in accordance with the teachings given in co-owned U.S. Pat. No. 6,011,192, entitled "Membrane-Based Conditioning for Adsorption System Feed Gas", the residue stream is also characterized by a hydrocarbon dewpoint substantially below the dewpoint of the feed stream, 101. By substantially below, we mean that the dewpoint of stream 103 at 200 psia is at least about 10° C. lower than the dewpoint of stream 101 at 200 psia, preferably at least about 20° C. lower, more preferably at least about 30° C. lower and most preferably at least about 40° C. lower. The amount of $C_5$–$C_8$ hydrocarbon removal that this represents will depend, of course, on the specific components present in the feed. As a non-limiting example, in a stream containing $C_5$, $C_6$, $C_7$ and $C_8$ components, all at concentrations of less than 1%, a 10° C. reduction in dewpoint might represent removal of $C_8$ only, a 20° C. reduction in dewpoint might represent removal of most $C_6$–$C_8$, and a 40° C. reduction in dewpoint might represent removal of essentially all $C_5$–$C_8$ hydrocarbon components, plus some lighter components.

A benefit of using rubbery or superglassy membranes is that they provide much higher transmembrane fluxes than conventional glassy membranes. For example, the permeability of silicone rubber to methane is 800 Barrer, compared with a permeability of less than about 10 Barrer for 6FDA polyimide or cellulose acetate.

Returning to FIG. 1, stream 103 passes to the pressure swing adsorption step 110. Optionally, other intermediate treatments may be carried out before the pressure swing adsorption step, for example to remove water vapor remaining in the stream, and the pressure of the stream may be let down or increased as desired to meet the operating requirements of the PSA unit. FIG. 1, and the other figures, shows stream 103 as being added to stream 106 before entering the PSA step. Those of skill in the art will appreciate that stream 103 may also be treated separately from stream 106, either in the same beds or in a different PSA unit. Furthermore, as is known in the art, and as is mentioned below, the operating cycle of PSA units is complex, and depending on the size, pressure and composition of stream 103, it may sometimes be advantageous to introduce all or part of this stream during the repressurization step or elsewhere in the cycle. Such alternatives are within the scope of the claimed process.

PSA systems usually comprise a series of beds of a zeolite or similar material that will selectively sorb one or more components of the gas mixture. In the present invention, the beds preferentially sorb hydrocarbons and reject hydrogen. The beds are connected in such a way that each bed can be switched periodically from adsorption mode to regeneration mode. As one bed or set of beds is taken off-line for regeneration, another bed or set of beds is switched in so that gas can be processed continuously. In the sorption mode, which is typically carried out at elevated pressure, typically above 150 psia, such as 200 psia, 300 psia, 500 psia or above, hydrocarbons are adsorbed onto the active beds. The non-adsorbed gas stream exiting the bed, stream 108, is the purified hydrogen product, and typically has a very high hydrogen content, such as 99 vol % hydrogen or higher.

When the adsorbing beds have been charged to the desired level, they are switched into desorption/regeneration mode. The desorption/regeneration step can be carried out by any convenient techniques known in the art. Such techniques include, but are not limited to, passing a displacement gas cocurrently through the bed to sweep out unadsorbed gas from the void spaces, cocurrent depressurization of the bed to position the mass transfer front appropriately, countercurrent depressurization to remove previously adsorbed gas, and countercurrent purging to complete regeneration of the bed for reuse.

Depressurization of the bed during these steps may take place by multiple reductions in pressure, as is known in the art, and may reduce the pressure to atmospheric pressure (15 psia) or below. Removal of void space gas and positioning of the mass transfer front is preferably carried out, however, at a pressure in the range 50–250 psia, and countercurrent desorption is preferably carried out at a pressure no lower than 15 psia, more preferably in the range 15–75 psia, yet more preferably no lower than about 30 psia and most preferably no lower than about 50 psia.

By way of non-limiting example, a typical bed cycle may be: (i) adsorption at 500 psia; (ii) depressurization to 200 psia under cocurrent flow conditions; (iii) depressurization to 50 psia under countercurrent flow conditions; (iv) purging at 50 psia; (v) repressurization.

The gases that are removed during the desorption/regeneration steps are shown generally in FIG. 1 as stream 109. In practice, several streams of different compositions will be produced during the individual parts of the regeneration cycle. This hydrocarbon rich tail gas may be sent to any destination, including, but not limited, the fuel supply for heating the steam reformer or the feed intake of the steam reformer.

The membrane separation step produces permeate stream 102, enriched in hydrocarbon content compared with stream 101. Stream 102 is compressed if necessary, heated to about 500° C. or above and introduced in conjunction with water stream 105, in the form of steam, into the steam/hydrocarbon reforming step 107. Fuel for heating the steam reforming system is provided by stream 111. The steam reforming step may be carried out in any convenient manner. Steam reforming reactors and operations are well known in the art and do not require any lengthy description herein. The reforming operation involves a first step to react methane or another light hydrocarbon and water to form hydrogen, carbon monoxide and carbon dioxide. This reaction is generally performed at high temperature and pressure, in the presence of a nickel catalyst, by passing the feed gas mixture through externally fired reformer tubes filled with the desired catalyst, and may be carried out in a single-stage or multi-stage reactor. The gas leaving the reforming reactor frequently contains as much as about 15% carbon monoxide and 5–10% unreacted methane. Preferably, but not necessarily, a second step, a shift conversion step, carried out in a separate shift reactor, is used to react carbon monoxide formed in the primary reforming reactors with water, thereby converting the carbon monoxide to carbon dioxide and forming more hydrogen. As with the primary reforming reaction step, the shift conversion step may be carried out in one or more stages. Depending on the specific target composition for the synthesis gas, the shift reactors may treat all of the gas output from the reforming reactors, or the shift reactor may be installed in a bypass line to treat just a portion of the reforming reactor effluent, and the effluent gas from the shift reactor may be remixed into the main synthesis gas stream to create a gas of a specific composition.

The steam reforming step 107 may comprise any of these reaction schemes. A raw synthesis gas, stream 106, is withdrawn from the reaction step and passed to pressure swing adsorption step 110 as generally discussed above for separation into a high-purity hydrogen product and a hydrocarbon-rich tail gas. Those of skill in the art will appreciate that additional purification steps for the raw synthesis gas or for the hydrogen product stream, such as treatment specifically to remove carbon monoxide and/or carbon dioxide may be included within the scope of the process of the invention.

Figure 2:
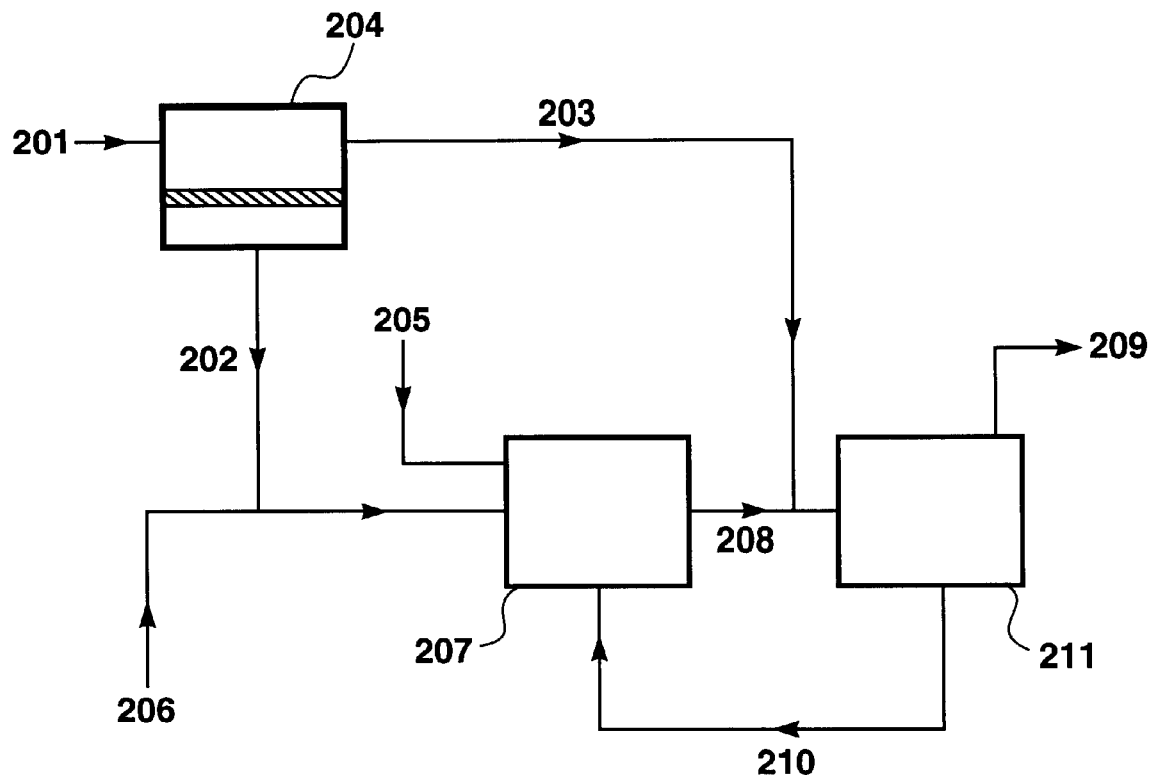
FIG. 2 is a schematic drawing showing a preferred embodiment of the invention in which natural gas is used as an additional feedstock to the steam reformer, and in which PSA tail gas is used as fuel to heat the steam reformer.

FIG. 2 shows an alternative and most preferred embodiment of the invention. Referring to FIG. 2, stream 201, containing hydrogen, a $C_1$–$C_4$ hydrocarbon and a $C_5$–$C_8$ hydrocarbon, enters the membrane separation step or unit, 204. As before, the membrane unit contains a membrane that exhibits selectivity in favor of hydrocarbons over hydrogen, and all the issues, considerations, choices and preferences discussed above with regard to the membrane separation step of FIG. 1 apply equally to this embodiment. Optionally, a compressor may be installed in line 201 to raise the gas pressure to any desired pressure. The hydrocarbons permeate the membrane and are removed as hydrocarbon-enriched, hydrogen-depleted permeate stream 202. The remaining hydrogen-enriched, hydrocarbon-depleted gas is withdrawn from the feed side of the unit as residue stream 203. This stream passes as feed into PSA unit, 211, where selective adsorption of the non-hydrogen components of the stream is carried out in any convenient manner, such as described in relation to FIG. 1 above. The purified hydrogen product stream, 209, is withdrawn for use as desired, and the desorbed hydrocarbons are withdrawn as stream 210 and passed to the steam reformer 207 as fuel.

The membrane permeate stream 202 is used as feedstock to the steam/hydrocarbon reforming step 207. In this embodiment, additional hydrocarbon feedstock to the reformer is provided by stream 206. Stream 206 may be a natural gas stream, for example, or any other suitable stream containing methane and/or other light hydrocarbons. The relative contributions to the feedstock of streams 202 and 206 may be in any ratio. Typically, although not necessarily, the major portion of the hydrocarbon feed is provided by stream 206 supplemented by stream 202. As in the embodiment of FIG. 1, the hydrocarbon feed is brought to desired conditions and introduced into the reformer train in conjunction with steam stream, 205. The steam reforming step is carried out generally as described with respect to FIG. 1 above in any convenient manner. The syngas stream is withdrawn as stream 208 and passed to the PSA step 211.

Figure 3:
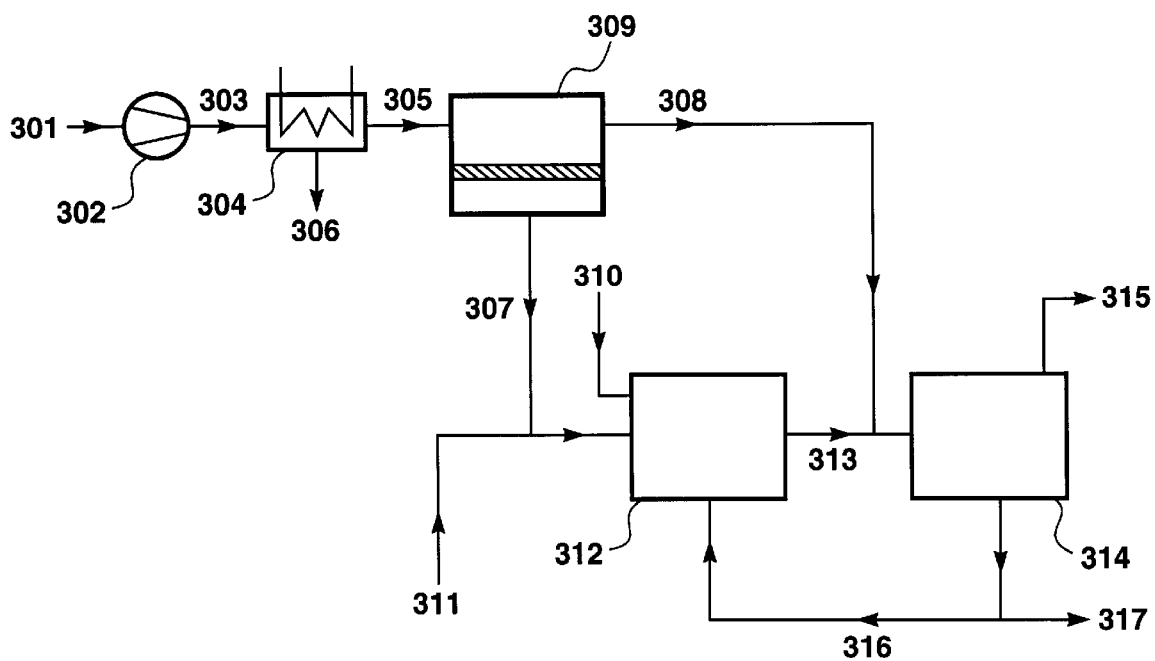
FIG. 3 is a schematic drawing showing an embodiment of the invention in which the incoming gas stream is subjected to compression and cooling before entering the membrane separation step.

An alternative embodiment specifically involving compression of the process feed stream is shown in FIG. 3. This embodiment is useful, for example, in situations where the incoming stream 301 is comparatively rich in $C_5-C_8$ hydrocarbons, and may be used to recover a portion of heavier hydrocarbons in liquid form. Referring to the figure, stream 301, containing hydrogen, a $C_1-C_4$ hydrocarbon and a $C_5-C_8$ hydrocarbon, enters the intake of compressor 302, emerges as compressed stream 303, and is cooled in after cooler or condenser 304. To condense the heavier hydrocarbon fraction, it is usually possible, and is preferred, to use only modest cooling of the stream, such as to no lower than about 20° C. or 10° C. The condensate is removed as stream 306.

The remainder of the stream passes on as stream 305 to the membrane separation step or unit, 309. In the case of compression/condensation, stream 305 is now saturated with hydrocarbons under the prevailing pressure and temperature conditions. Even though the stream is saturated, however, it can be passed safely to the membrane conditioning step, because the membranes used are able to handle such streams.

As before, the membrane unit contains a membrane that exhibits selectivity in favor of $C_{5+}$ hydrocarbons over hydrogen, and all the issues, considerations, choices and preferences discussed above with regard to the membrane separation step of FIG. 1 apply equally to this embodiment. The hydrocarbons permeate the membrane preferentially and are removed as hydrocarbon-enriched permeate stream 307. The remaining hydrogen-enriched gas is withdrawn from the feed side of the membrane unit as residue stream 308, and passes to the selective adsorption step, 314 which may be carried out in any convenient manner, such as described in relation to FIG. 1 above. The purified hydrogen product stream, 315, is withdrawn for use as desired, and the desorbed light hydrocarbons are withdrawn. FIG. 3 shows an embodiment in which a portion of the desorbed hydrocarbons, stream 316, is used as fuel for the reformer, and a portion, 317, is discharged.

The membrane permeate stream 307 provides feedstock to the steam/hydrocarbon reforming step 312, supplemented by additional hydrocarbon feedstock stream 311. As in the embodiment of FIG. 1, the hydrocarbon feed is brought to desired conditions and introduced into the reformer train in conjunction with steam stream, 310. The steam reforming step is carried out generally as described with respect to FIG. 1 above in any convenient manner. The syngas stream is withdrawn as stream 313 and passed to the PSA step 314.

In another aspect, the invention is an apparatus for producing hydrogen. In a basic embodiment, the apparatus of the invention comprises:

(i) membrane means for performing a membrane separation step to produce a hydrogen-enriched residue and a hydrocarbon-enriched permeate from a mixed hydrogen/hydrocarbon feed stream, containing at least a $C_1-C_4$ hydrocarbon, a $C_5-C_8$ hydrocarbon and hydrogen;

(ii) steam-reforming means for performing a steam/hydrocarbon reforming step by reacting hydrocarbons in the hydrocarbon-enriched permeate with steam to form a synthesis gas product stream; the membrane means and the steam-reforming means being connected so that the hydrocarbon-enriched permeate can flow from the membrane means to the steam-reforming means;

(iii) at least one adsorption means for performing a pressure swing adsorption step to separate product hydrogen from other gases by preferentially adsorbing the other gases and rejecting hydrogen; the membrane means and the at least one adsorption means being connected so that the hydrogen-enriched residue can flow from the membrane means to the at least one adsorption means, and the steam-reforming means and the at least one adsorption means being connected so that at least a portion of the synthesis gas product stream can flow from the steam-reforming means to the at least one adsorption means;

(iv) means for withdrawing purified hydrogen from the at least one adsorption means;

(v) means for desorbing and withdrawing sorbed gases from the at least one adsorption means;

(vi) optional means for feeding desorbed gases from the at least one adsorption means to the steam-reforming means as fuel for heating the steam-reforming means.

The figures described above also show the elements of the apparatus of the invention in various embodiments. For example, referring again to FIG. 2, line 201 represents the feed stream inlet line carrying the raw hydrocarbon feedstock to the feed side of the membrane means or separation unit, 204. The membrane separation unit or means contains a membrane selective for hydrocarbons over hydrogen, and is adapted, in terms of piping, valves, controls, module configuration, spacer materials and so on, as is known in the art, for producing a residue stream enriched in hydrogen and a permeate stream enriched in hydrocarbons. The residue stream is withdrawn from the membrane separation unit through line 203, which is connected to the adsorption means or pressure swing adsorption unit, 211, so that the hydrogen-enriched residue may be passed to the adsorption unit for hydrogen separation and recovery.

The hydrocarbon-enriched permeate is withdrawn from the membrane separation unit or means through line 202, which is connected to the steam-reforming means, 207. Line 205 provides for introduction of steam to the steam-reforming unit or means. Line 206 provides for introduction of additional hydrocarbon feedstock to the steam-reforming unit or means. The steam-reforming means is adapted to carry out the type of reforming-reactions described above. Synthesis gas produced in the steam-reforming means is withdrawn through line, 208, which connects the steam reformer, either directly as shown or through optional intermediate treatments as desired, to the adsorption means or pressure swing adsorption unit.

Line 209 provides means for withdrawing purified hydrogen from the PSA unit and line 210 provides means for withdrawing tail gases produced during bed regeneration and optionally for directing these gases, as shown in the figure, to the fuel inlet of the steam-reforming means.

The invention is now further described by the following examples, which are intended to be illustrative of the invention, but are not intended to limit the scope or underlying principles in any way.

EXAMPLE 1

Not in Accordance with the Invention

It was assumed that synthesis gas was to be prepared by steam reforming of a 75 MMscfd natural gas stream with 30

MMscfd of steam. The natural gas stream was assumed to be composed only of 96% methane, 3% ethane and 1% propane. The total composition of the reformer feedstock, expressed in vol % and MMscfd, is thus as shown in Table 1.

TABLE 1

| Stream | Hydrocarbons | Steam | Total |
|---|---|---|---|
| Flow (lbmol/h) | 8,235 | 3,294 | 11,529 |
| Flow (MMscfd) | 75 | 30 | 105 |
| Temp. (° C.) | 180 | 500 | 322 |
| Pressure (psia) | 400 | 400 | 400 |
| Component (MMscfd): | | | |
| Hydrogen | 0.0 | 0.0 | 0.0 |
| Methane | 72.0 | 0.0 | 72.0 |
| Ethane | 2.25 | 0.0 | 2.25 |
| Propane | 0.75 | 0.0 | 0.75 |
| Water | 0.0 | 30.0 | 30.0 |
| Component (vol %): | | | |
| Hydrogen | 0.0 | 0.0 | 0.0 |
| Methane | 96.0 | 0.0 | 68.6 |
| Ethane | 3.0 | 0.0 | 2.1 |
| Propane | 1.0 | 0.0 | 0.7 |
| Water | 0.0 | 100.0 | 28.6 |

It was further assumed for simplicity that the reforming reactions result in 100% conversion of hydrocarbons and steam to hydrogen and carbon dioxide. At 100% conversion, 75 MMscfd of hydrocarbons and 30 MMscfd of steam yield 311 MMscfd of hydrogen.

EXAMPLE 2

Not in Accordance with the Invention

The calculations of Example 1 were repeated, except that in this case it was assumed that the 75 MMscfd of hydrocarbon feedstock was made up of about 50 MMscfd of natural gas having the same composition as in Example 1 and about 25 MMscfd of a refinery waste stream having the following composition:

| | |
|---|---|
| Hydrogen | 52 vol % |
| Methane | 27 vol % |
| Ethane | 12 vol % |
| Propane | 5 vol % |
| n-Butane | 2 vol % |
| n-Pentane | 2 vol % |
| Nitrogen | 0.1 vol % |

This stream has a dewpoint at 200 psia of 9.5° C. The total composition of the reformer feedstock, expressed in vol% and MMscfd is thus as shown in Table 2.

TABLE 2

| Stream | Refinery waste | Natural gas | Steam | Total |
|---|---|---|---|---|
| Flow (lbmol/h) | 2,771 | 5,464 | 3,294 | 11,529 |
| Flow (MMscfd) | 25.2 | 49.8 | 30 | 105 |
| Temp. (° C.) | 180 | 180 | 500 | 322 |
| Pressure (psia) | 750 | 400 | 400 | 400 |
| Component (MMscfd): | | | | |
| Hydrogen | 13.1 | 0.0 | 0.0 | 13.1 |
| Methane | 6.9 | 47.8 | 0.0 | 54.7 |

TABLE 2-continued

| Stream | Refinery waste | Natural gas | Steam | Total |
|---|---|---|---|---|
| Ethane | 3.0 | 1.5 | 0.0 | 4.5 |
| Propane | 1.2 | 0.5 | 0.0 | 1.7 |
| n-Butane | 0.5 | 0.0 | 0.0 | 0.5 |
| n-Pentane | 0.5 | 0.0 | 0.0 | 0.5 |
| Nitrogen | 0.02 | 0.0 | 0.0 | 0.02 |
| Water | 0.0 | 0.0 | 30.0 | 30.0 |
| Component (vol %): | | | | |
| Hydrogen | 51.7 | 0.0 | 0.0 | 12.5 |
| Methane | 27.4 | 96.0 | 0.0 | 52.1 |
| Ethane | 11.9 | 3.0 | 0.0 | 4.3 |
| Propane | 4.8 | 1.0 | 0.0 | 1.6 |
| n-Butane | 2.0 | 0.0 | 0.0 | 0.5 |
| n-Pentane | 2.0 | 0.0 | 0.0 | 0.5 |
| Nitrogen | 0.1 | 0.0 | 0.0 | — |
| Water | 0.0 | 0.0 | 100.0 | 28.6 |

— = less than 0.01

It was again assumed for simplicity that the hydrocarbon/steam reforming reactions result in 100% conversion of hydrocarbons and steam to hydrogen and carbon dioxide. Under these idealized conditions, the feedstock yields 295.3 MMscfd of hydrogen. The yield is less than that obtained from a pure hydrocarbon feed because the hydrogen already in the refinery waste stream occupies space in the reactor at the expense of potentially hydrogen-richer components.

EXAMPLE 3

A computer calculation was performed with a modeling program, ChemCad III (ChemStations, Inc. Houston, Tex.), to demonstrate some of the advantages of the process of the invention, as reflected in the embodiment of FIG. 2. It was assumed that the feed available for use in the process, stream 201, was a refinery waste stream having the same composition as in Example 2, and that after treatment in the membrane unit, the hydrocarbon-enriched gas, stream 202 was used in conjunction with a natural gas stream, stream 206 having the same composition as in Example 1, as the hydrocarbon feedstock for the steam reformer. It was further assumed that the hydrocarbon feedstock flow was 75 MMscfd, as in the previous examples, made up of roughly 50 MMscfd of natural gas (stream 206) and 25 MMscfd of membrane-treated refinery waste (stream 202).

For simplicity, the modeling program was used only to model the membrane separation step, and it was assumed, as in the previous examples, that the conversion efficiency of the hydrocarbon/steam reforming step was 100%. The membrane separation step was assumed to be carried out using a silicone rubber membrane. The composition of the reformer feedstock streams and the results of the membrane separation step are shown in Table 3.

TABLE 3

| | | | Reformer feedstock | | | |
|---|---|---|---|---|---|---|
| Stream | 201 | 202 | 206 | 205 | Total | 203 |
| Flow (lbmol/h) | 2,771 | 2,569 | 5,666 | 3,294 | 11,529 | 201.9 |
| Flow (MMscfd) | 25.2 | 23.4 | 51.6 | 30 | 105 | 1.8 |
| Temp. (° C.) | 100 | 90 | 180 | 500 | 320 | 80 |

TABLE 3-continued

| | Reformer feedstock | | | | | |
|---|---|---|---|---|---|---|
| Stream | 201 | 202 | 206 | 205 | Total | 203 |
| Pressure (psia) | 750 | 400 | 400 | 400 | 400 | 740 |
| Component (MMscfd): | | | | | | |
| Hydrogen | 13.1 | 11.8 | 0.0 | 0.0 | 11.8 | 1.3 |
| Methane | 6.9 | 6.5 | 49.5 | 0.0 | 56.0 | 0.4 |
| Ethane | 3.0 | 2.9 | 1.5 | 0.0 | 4.5 | 0.1 |
| Propane | 1.2 | 1.2 | 0.5 | 0.0 | 1.7 | 0.02 |
| n-Butane | 0.5 | 0.5 | 0.0 | 0.0 | 0.5 | — |
| n-Pentane | 0.5 | 0.5 | 0.0 | 0.0 | 0.5 | — |
| Nitrogen | 0.02 | 0.02 | 0.0 | 0.0 | 0.02 | — |
| Water | 0.0 | 0.0 | 0.0 | 30.0 | 30.0 | 0.0 |
| Component (vol %): | | | | | | |
| Hydrogen | 52.0 | 50.4 | 0.0 | 0.0 | 11.2 | 72.2 |
| Methane | 27.4 | 27.8 | 96.0 | 0.0 | 53.3 | 22.2 |
| Ethane | 11.9 | 12.4 | 3.0 | 0.0 | 4.3 | 3.8 |
| Propane | 4.7 | 5.1 | 1.0 | 0.0 | 1.6 | 1.0 |
| n-Butane | 2.0 | 2.1 | 0.0 | 0.0 | 0.5 | 0.4 |
| n-Pentane | 2.0 | 2.1 | 0.0 | 0.0 | 0.5 | 0.4 |
| Nitrogen | 0.1 | 0.1 | 0.0 | 0.0 | — | 0.2 |
| Water | 0.0 | 0.0 | 0.0 | 100.0 | 28.6 | 0.0 |

— = less than 0.01

The membrane area required to separate stream 201 was calculated to be about 2,000 m². Assuming total steam/hydrocarbon conversion, the amount of hydrogen produced by the reforming step in this case is 300.25 MMscfd. Thus, the process of the invention provides an increase in the hydrogen production from the reformer of almost 5 MMscfd compared with the prior art process.

EXAMPLE 4

Not in Accordance with the Invention

It was assumed that synthesis gas was to be prepared by steam reforming of 10 MMscfd of a light ends stream from a refinery operation. The stream was assumed to have the following composition:

| | |
|---|---|
| Hydrogen | 55 vol % |
| Methane | 17 vol % |
| Ethane | 12 vol % |
| C₃ components | 7 vol % |
| C₄ components | 5 vol % |
| C₅ components | 3 vol % |
| C₆ components | 1 vol % |

This stream has a dewpoint at 200 psia of about 35° C. It was assumed as before that the reforming results in 100% conversion of hydrocarbons and steam to hydrogen and carbon dioxide. At 100% conversion, this 10 MMscfd stream yields 5.5 MMscfd of hydrogen that passes through the reformer unchanged, and 35.4 MMscfd of hydrogen produced by complete reaction of the hydrocarbons with steam, or a total of 40.9 MMscfd of hydrogen.

EXAMPLE 5

A computer calculation was performed as in Example 3 to compare the amount of hydrogen that can be produced from the light ends stream of Example 4 by using the process of the invention as reflected in the embodiment of FIG. 1. It was assumed that the feed available for use in the process, stream 101, has the same composition as in Example 4, and that the reformer capacity is again 10 MMscfd of hydrocarbons.

The modeling program was used only to model the membrane separation step, and it was assumed, as in the previous examples, that the conversion efficiency of the hydrocarbon/steam reforming step was 100%. The membrane separation step was assumed to be carried out using a silicone rubber membrane. The results of the membrane separation step are shown in Table 4.

TABLE 4

| Stream | 101 | 103 | 102 |
|---|---|---|---|
| Flow (lb/h) | 22,479 | 1,566 | 20,912 |
| Flow (MMscfd) | 11.8 | 1.8 | 10 |
| Temperature (° C.) | 65 | 60 | 60 |
| Pressure (psia) | 600 | 600 | 300 |
| Component (vol %) | | | |
| Hydrogen | 55.0 | 75.0 | 51.5 |
| Methane | 17.0 | 16.3 | 17.1 |
| Ethane | 12.0 | 4.9 | 13.3 |
| C₃ | 7.0 | 2.1 | 7.9 |
| C₄ | 5.0 | 1.0 | 5.7 |
| C₅ | 3.0 | 0.6 | 3.4 |
| C₆ | 1.0 | 0.2 | 1.1 |

The membrane separation step produces 10 MMscfd of hydrocarbon-enriched permeate, which was assumed to form the feedstock to the steam reformer. At 100% conversion, this slightly richer 10 MMscfd stream yields 5.2 MMscfd of hydrogen that passes through the reformer unchanged, and 39.0 MMscfd of hydrogen produced by complete reaction of the hydrocarbons with steam, or a total of 44.1 MMscfd of hydrogen. Thus, steam reformer output is increased by 3.2 MMscfd of hydrogen compared with the prior art process.

We claim:

1. A hydrogen-production process, comprising the following steps:
    (a) providing a gas stream containing at least a $C_1$–$C_4$ hydrocarbon, a $C_5$–$C_8$ hydrocarbon and hydrogen;
    (b) passing the gas stream across the feed side of a polymeric membrane having a feed side and a permeate side, the membrane being selective in favor of the $C_1$–$C_4$ hydrocarbon and the $C_5$–$C_8$ hydrocarbon over hydrogen, under conditions such that a driving force for transmembrane permeation is provided by a pressure difference between the feed and permeate sides;
    (c) withdrawing from the permeate side a hydrocarbon stream enriched in the $C_1$–$C_4$ hydrocarbon and the $C_5$–$C_8$ hydrocarbon and depleted in hydrogen compared with the gas stream;
    (d) withdrawing from the feed side a residue stream enriched in hydrogen compared with the gas stream;
    (e) feeding the hydrocarbon stream to a steam reformer and there reacting the $C_1$–$C_4$ hydrocarbon and the $C_5$–$C_8$ hydrocarbon with steam to form a synthesis gas product stream;
    (f) passing the synthesis gas product stream and the residue stream through a pressure swing adsorption system thereby selectively adsorbing hydrocarbons and rejecting hydrogen;
    (g) withdrawing a purified hydrogen product stream from the pressure swing adsorption system;
    (h) withdrawing a waste gas stream from the pressure swing adsorption system.

2. The process of claim 1, wherein step (e) comprises a first reaction step that includes formation of carbon monoxide and a second reaction step that includes a shift reaction to convert the carbon monoxide to carbon dioxide.

3. The process of claim 1, wherein the membrane comprises a rubbery polymer.

4. The process of claim 1, wherein the membrane comprises silicone rubber.

5. The process of claim 1, wherein the membrane comprises a superglassy polymer.

6. The process of claim 1, wherein at least a portion of the waste gas stream is used as fuel to provide heat for step (e).

7. The process of claim 1, wherein the $C_1$–$C_4$ hydrocarbon comprises methane.

8. The process of claim 1, wherein the gas stream comprises off-gas from a refinery operation.

9. The process of claim 1, wherein the gas stream comprises off-gas from a hydrotreater.

10. The process of claim 1, wherein the gas stream comprises off-gas from a hydrocracker.

11. The process of claim 1, further comprising adding natural gas to the hydrocarbon stream prior to feeding the hydrocarbon stream to the steam reformer.

12. The process of claim 1, further comprising compressing the gas stream prior to passing the gas stream across the feed side.

13. The process of claim 1, further comprising compressing and cooling the gas stream thereby condensing a liquid $C_5$–$C_8$ hydrocarbon fraction, which is removed from the gas stream prior to passing the gas stream across the feed side.

14. The process of claim 1, wherein the residue stream contains at least 70 vol % hydrogen.

15. The process of claim 1, wherein the residue stream is reduced in $C_5$–$C_8$ hydrocarbon content by at least 80% compared with the gas stream.

16. The process of claim 1, wherein the gas stream has a hydrocarbon dewpoint of at least 10° C. at 200 psia.

17. The process of claim 1, wherein the gas stream has a first hydrocarbon dewpoint and the residue stream has a second hydrocarbon dewpoint and the second hydrocarbon dewpoint is at least 10° C. lower at 200 psia than the first hydrocarbon dewpoint.

* * * * *